(12) United States Patent
Kaneko et al.

(10) Patent No.: US 11,065,510 B2
(45) Date of Patent: Jul. 20, 2021

(54) GOLF BALL

(71) Applicant: Sumitomo Rubber Industries, Ltd., Kobe (JP)

(72) Inventors: Takumi Kaneko, Kobe (JP); Takahiro Shigemitsu, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/019,842

(22) Filed: Sep. 14, 2020

(65) Prior Publication Data

US 2021/0093927 A1    Apr. 1, 2021

(30) Foreign Application Priority Data

Sep. 30, 2019  (JP) .............................. JP2019-178510

(51) Int. Cl.
  *A63B 37/06* (2006.01)
  *A63B 37/00* (2006.01)
  *C08F 36/06* (2006.01)
  *C08C 19/36* (2006.01)

(52) U.S. Cl.
  CPC ...... *A63B 37/0051* (2013.01); *A63B 37/0063* (2013.01); *A63B 37/0074* (2013.01); *A63B 37/0096* (2013.01); *A63B 37/00621* (2020.08); *A63B 37/00622* (2020.08); *C08C 19/36* (2013.01); *C08F 36/06* (2013.01); *C08F 2810/20* (2013.01)

(58) Field of Classification Search
  CPC .......................... A63B 37/005; A63B 37/0051

USPC .......................................................... 473/370
See application file for complete search history.

(56) References Cited

U.S. PATENT DOCUMENTS

2013/0123044 A1    5/2013   Mikura et al.

FOREIGN PATENT DOCUMENTS

JP    2013-27487 A    2/2013
JP    2013-27488 A    2/2013

*Primary Examiner* — Raeann Gorden
(74) *Attorney, Agent, or Firm* — Birch, Stewart, Kolasch & Birch, LLP

(57) ABSTRACT

An object of the present invention is to provide a golf ball having a low spin rate on driver shots. The present invention provides a golf ball comprising a spherical core and at least one cover layer covering the spherical core, wherein the spherical core is formed from a rubber composition containing (a) a base rubber, (b) a co-crosslinking agent, (c) a crosslinking initiator, and (d) a RAFT agent, (b) the co-crosslinking agent contains an α,β-unsaturated carboxylic acid having 3 to 8 carbon atoms and/or a metal salt thereof, and (d) the RAFT agent is a compound represented by the formula (1):

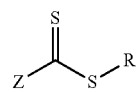

(1)

in the formula (1), R represents a monovalent organic group, and Z represents a monovalent organic group.

19 Claims, 1 Drawing Sheet

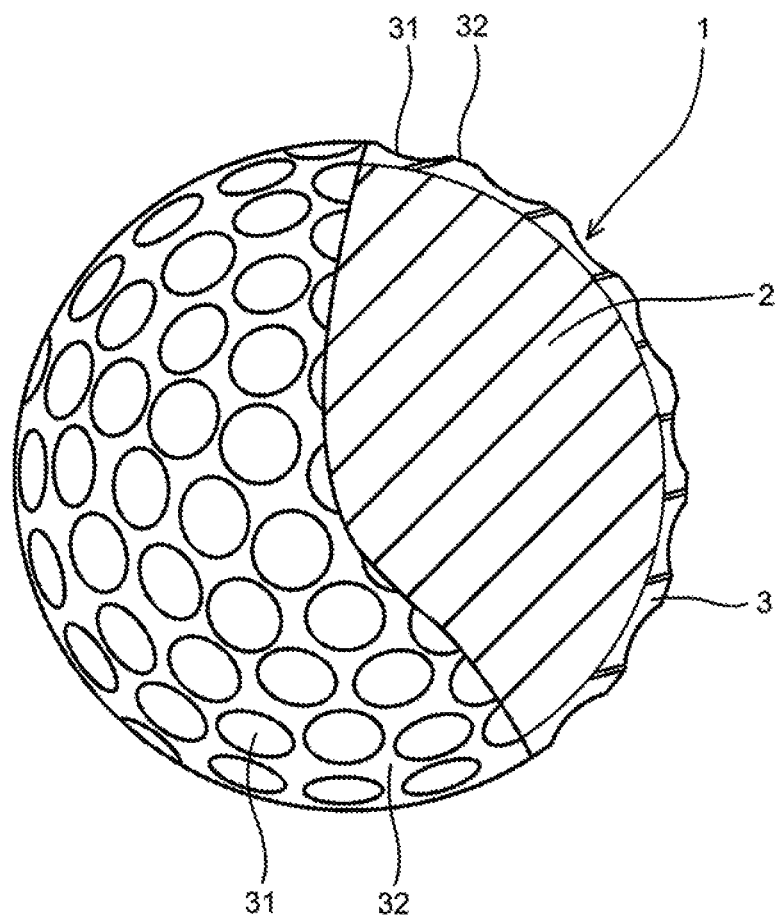

GOLF BALL

FIELD OF THE INVENTION

The present invention relates to a golf ball, and particularly relates to a technology for improving a spherical core.

DESCRIPTION OF THE RELATED ART

As a method for increasing a flight distance of a golf ball on driver shots, for example, there are a method of using a core having high resilience, and a method of using a core having a hardness distribution in which the hardness increases from the core center toward the core surface (outer-hard and inner-soft structure). The former method has an effect of enhancing a golf ball initial speed, and the latter method has an effect of a higher launch angle and a lower spin rate. A golf ball having a higher launch angle and a lower spin rate travels a greater flight distance.

Further, a technology of adding a specific additive in a rubber composition for preparing a core to increase the outer-hard and inner-soft degree of the obtained core has been proposed. For example, Japanese Patent Publication No. 2013-027487 A and Japanese Patent Publication No. 2013-027488 A disclose a golf ball comprising a spherical core and at least one cover layer covering the spherical core, wherein the spherical core is formed from a rubber composition containing (a) a base rubber, (b) an $\alpha,\beta$-unsaturated carboxylic acid having 3 to 8 carbon atoms and/or a metal salt thereof as a co-crosslinking agent, (c) a crosslinking initiator, and (d) a carboxylic acid having 4 to 30 carbon atoms or a carboxylic acid salt having 4 to 30 carbon atoms.

In the golf balls disclosed in Japanese Patent Publication No. 2013-027487 A and Japanese Patent Publication No. 2013-027488 A, the carboxylic acid or the carboxylic acid salt is considered to have an action of exchanging a cation with the ion cluster formed by the co-crosslinking agent to break the metal crosslinking. When the core is molded, the core inner temperature is high at the core central part and is getting lower towards the core surface. Thus, the cleavage of the metal crosslinking by the carboxylic acid or the carboxylic acid salt easily occurs at the core center part, and more hardly occurs towards the core surface. As a result, the crosslinking density inside the core is considered to become higher from the core center to the core surface.

SUMMARY OF THE INVENTION

An object of the present invention is to provide a golf ball having a low spin rate on driver shots.

The present invention that has solved the above problem provides a golf ball comprising a spherical core and at least one cover layer covering the spherical core, wherein the spherical core is formed from a rubber composition containing (a) a base rubber, (b) a co-crosslinking agent, (c) a crosslinking initiator, and (d) a Reversible Addition Fragmentation Chain Transfer agent (hereinafter, sometimes referred to as "RAFT agent"), (b) the co-crosslinking agent contains an $\alpha,\beta$-unsaturated carboxylic acid having 3 to 8 carbon atoms and/or a metal salt thereof, and (d) the RAFT agent includes a compound represented by the formula (1).

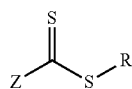

(1)

in the formula (1), R represents a monovalent organic group, and Z represents a monovalent organic group.

Blending (d) the RAFT agent in the rubber composition can control the reaction of (b) the co-crosslinking agent. Thus, when the spherical core is molded, the temperature at the core surface part can be controlled. However, since the heat is easily reserved at the core central part, the temperature at the core central part tends to get higher than the set temperature. Thus, the core hardness is increased by the action of (d) the RAFT agent at the core surface part. On the contrary, (d) the RAFT agent does not work at the core central part, and thus the core center hardness is not increased. Thus, if (d) the RAFT agent is blended, the obtained spherical core has a great outer-hard and inner-soft degree. The golf ball comprising a spherical core with a great outer-hard and inner-soft degree has a low spin rate on driver shots.

According to the present invention, a golf ball having a low spin rate on driver shots is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a spherical core and at least one cover layer covering the spherical core.

[Spherical Core]

The spherical core is formed from a rubber composition containing (a) a base rubber, (b) a co-crosslinking agent, (c) a crosslinking initiator, and (d) a RAFT agent, wherein (b) the co-crosslinking agent contains an $\alpha,\beta$-unsaturated carboxylic acid having 3 to 8 carbon atoms and/or a metal salt thereof, and (d) the RAFT agent includes a compound represented by the formula (1).

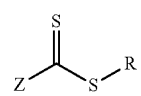

(1)

in the formula (1), R represents a monovalent organic group, and Z represents a monovalent organic group.

It is considered that the metal salt of the $\alpha,\beta$-unsaturated carboxylic acid having 3 to 8 carbon atoms blended as (b) the co-crosslinking agent in the rubber composition conducts a graft polymerization to (a) the base rubber and forms ion cluster inside the core to provide a metal crosslinking of a rubber molecular chain when the core is molded. The reaction of (b) the co-crosslinking agent can be controlled by blending (d) the RAFT agent in the rubber composition. Thus, when the spherical core is molded, the temperature at the core surface part can be controlled. However, since the heat is easily reserved at the core central part, the temperature at the core central part tends to get higher than the set temperature. Since the temperature at the core surface part can be controlled to a temperature at which (d) the RAFT agent effectively works, the reaction of (b) the co-crosslinking agent proceeds at the core surface part by the action of (d) the RAFT agent, and the core surface hardness is increased. On the contrary, since the temperature at the core central part cannot be controlled to a temperature at which (d) the RAFT agent effectively works, (d) the RAFT agent does not work at the core central part, and the core central hardness is not increased. Thus, if (d) the RAFT agent is blended, the obtained spherical core has a low hardness at the central part and a high hardness at the surface part, and thus has a great outer-hard and inner-soft degree. The golf ball comprising a spherical core having a great outer-hard and inner-soft degree has a low spin rate on driver shots.

Next, the materials used in the present invention will be explained.

((d) RAFT Agent (Reversible Addition Fragmentation Chain Transfer Agent)

First, (d) the RAFT agent used in the present invention will be explained. (d) The RAFT agent is a chain transfer agent used in the Reversible Addition Fragmentation Chain Transfer (RAFT) polymerization, and includes a compound represented by the formula (1). (d) The RAFT agent is a compound having a thiocarbonylthio group (S=C—S) with the organic group R and the organic group Z as the substituent group. (d) The RAFT agent may be used solely, or two or more of them may be used in combination.

(1)

In the formula (1), R represents a monovalent organic group, and Z represents a monovalent organic group.

The organic group R and the organic group Z in the formula (1) are not particularly limited, as long as the compound represented by the formula (1) is capable of acting as the RAFT agent. R cleaves to generate a radical (R.), and this radical has an ability of reacting with the monomer (co-crosslinking agent) to re-initiate the polymerization. Z affects the stability of the intermediate radical (the formulae (11) and (12) in the scheme which will be described later), and controls the reactivity of the thiocarbonyl group (C=S) in the RAFT agent to the free radical addition. These R and Z can be appropriately selected depending on the type of (a) the base rubber and (b) the co-crosslinking agent to be used.

The reaction mechanism of the RAFT polymerization is shown in the following scheme. As shown in the following scheme, the reaction can be divided into five stages: (I) initiation, (II) chain transfer, (III) re-initiation, (IV) chain equilibrium, and (V) termination.

(I) Initiation

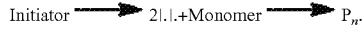

(II) Chain Transfer

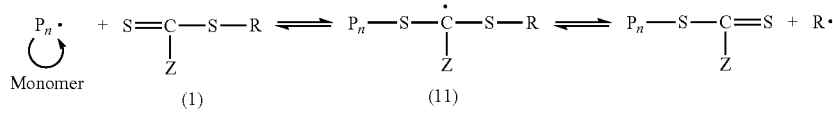

(III) Re-Initiation

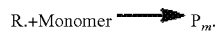

(IV) Chain Equilibrium

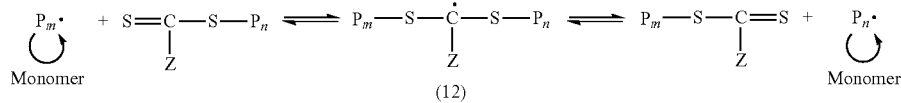

(V) Termination

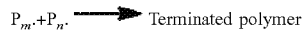

In the formula (1), R is preferably one member selected from the group consisting of an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, and a halogen atom.

In the formula (1), Z is preferably one member selected from the group consisting of an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, a dialkylphosphonate group, a diarylphosphonate group, a dialkylphosphinate group, a diarylphosphinate group, an organic group having a part of hydrogen atoms of these organic groups being substituted, a hydrogen atom, and a halogen atom.

The alkyl group includes a linear alkyl group, a branched alkyl group, and a cyclic alkyl group. The alkyl group preferably has 18 or less carbon atoms. Examples of the alkyl group include a methyl group, an ethyl group, a propyl group, an isopropyl group, a butyl group, a t-butyl group, a dodecyl group, a cyclopentyl group, and a cyclohexyl group.

The alkenyl group includes a linear alkenyl group, a branched alkenyl group, and a cyclic alkenyl group. The alkenyl group preferably has 18 or less carbon atoms. Examples of the alkenyl group include a vinyl group, a propenyl group, a butenyl group, and a pentenyl group.

The alkynyl group includes a linear alkynyl group, a branched alkynyl group, and a cyclic alkynyl group. The alkynyl group preferably has 18 or less carbon atoms. Examples of the alkynyl group include an ethynyl group, a propynyl group, a butynyl group, and a pentynyl group.

The aryl group includes a monocyclic aryl group, and a polycyclic aryl group. The aryl group preferably has 20 or less carbon atoms. Examples of the aryl group include a phenyl group, and a naphthyl group.

The aryl group included in the aralkyl group includes a monocyclic aryl group, and a polycyclic aryl group. The aralkyl group preferably has 20 or less carbon atoms. Examples of the aralkyl group include a benzyl group, a phenylethyl group, a phenylpropyl group, a phenylbutyl group, an a-cumyl group, and a 1-phenylethyl group.

The heterocyclyl group is a group having one hydrogen atom removed from any ring-forming atom of a heterocyclic compound. The heterocyclic compound is a cyclic compound having a carbon atom and an atom other than the carbon atom as ring-forming atoms, and is preferably a four-membered ring to a seven-membered ring. The atom constituting the heterocyclic compound other than the carbon atom is preferably one member selected from the group consisting of a nitrogen atom, an oxygen atom and a sulfur atom. Examples of the heterocyclyl group include a pyrrolidyl group, a piperidyl group, a pyrrolyl group, a pyridyl group, a tetrahydrofuryl group, a tetrahydropyranyl group, a furyl group, a tetrahydrothienyl group, a tetrahydrothiopyranyl group, a thienyl group, an imidazolidinyl group, an imidazolilyl group, an imidazolyl group, a pyrazolyl group, an oxazolidinyl group, an oxazolyl group, a thiazolidinyl group, a thiazolyl group, a piperazyl group, a morpholyl group, a pyridazinyl group, a pyrimidinyl group, a pyrazinyl group, a quinolyl group, an isoquinolyl group, and a quinazolinyl group.

The alkoxy group preferably has 18 or less carbon atoms. Examples of the alkoxy group include methoxy group, ethoxy group, propoxy group, and butoxy group.

The aryloxy group preferably has 20 or less carbon atoms. Examples of the aryloxy group include phenoxy group.

The aralkyloxy group preferably has 20 or less carbon atoms. Examples of the aralkyloxy group include α-cumyloxy group.

Examples of the heterocyclyloxy group include a pyrrolyloxy group, a pyridyloxy group, and a pyrimidinyloxy group.

The alkanoyl group preferably has 18 or less carbon atoms. Examples of the alkanoyl group include a formyl group, an acetyl group, a propionyl group, and a butylyl group.

The aroyl group preferably has 20 or less carbon atoms. Examples of the aroyl group include a benzoyl group, and a naphthoyl group.

Examples of the heterocyclylcarbonyl group include a pyrrolylcarbonyl group, a pyridylcarbonyl group, and a pyrimidylcarbonyl group.

The alkoxycarbonyl group preferably has 19 or less carbon atoms. Examples of the alkoxycarbonyl group include methoxycarbonyl group, ethoxycarbonyl group, and propoxycarbonyl group.

The aryloxycarbonyl group preferably has 21 or less carbon atoms. Examples of the aryloxycarbonyl group include phenoxycarbonyl group.

Examples of the heterocyclyloxycarbonyl group include a pyrrolyloxycarbonyl group, a pyridyloxycarbonyl group, and a pyrimidinyloxycarbonyl group.

The alkanoyloxy group has 18 or less carbon atoms. Examples of the alkanoyloxy group include acetyloxy group, and propionyloxy group.

The aroyloxy group preferably has 20 or less carbon atoms. Examples of the aroyloxy group include benzoyloxy group, and 1-naphthoyloxy group.

Examples of the heterocyclylcarbonyloxy group include a pyrrolylcarbonyloxy group, a pyridylcarbonyloxy group, and a pyrimidinylcarbonyloxy group.

The alkylthio group has 18 or less carbon atoms. Examples of the alkylthio group include methylthio group, ethylthio group, propylthio group, and dodecylthio group.

The arylthio group has 20 or less carbon atoms. Examples of the arylthio group include phenylthio group.

Examples of the substituent group of the organic group having a part of hydrogen atoms of the above organic groups being substituted include an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, an oxo group, and a halogen atom.

Examples of the organic group having a part of hydrogen atoms of the above organic groups being substituted include a cyanoalkyl group, a halogenated alkyl group, and an alkylamino group, and specific examples thereof include oxopyrrolidine-1-yl group, methylphenylamino group, methylpyridylamino group, 3,5-dimethylpyrazolyl group, 4-chloro-3,5-dimethylpyrazolyl group, cyanomethyl group, 2-cyanobutane-2-yl group, 1-cyanoethane-1-yl group, 2-cyanopropane-2-yl group, 2-phenylpropane-2-yl group, 1-cyano-1-phenylethane-1-yl group, and 2-(ethoxycarbonyl)propane-2-yl group.

Examples of the halogen atom include fluorine atom, chlorine atom, bromine atom, and iodine atom.

(d) The RAFT agent preferably includes at least one compound selected from the group consisting of the compounds represented by the formulae (2) to (5).

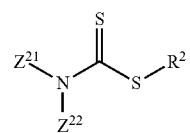

(2)

In the formula (2), $R^2$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^{21}$ and $Z^{22}$ represent an alkyl group, an alkenyl group, an alkynyl group, an aryl group, an aralkyl group, an amino group, or an organic group having a part of hydrogen atoms of these organic groups being substituted, and $Z^{21}$ and $Z^{22}$ may bond to each other to form a cyclic structure.

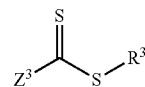

(3)

In the formula (3), $R^3$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^3$ represents an alkyl group, an alkenyl group, an alkynyl group, an aryl group, an aralkyl group, or an organic group having a part of hydrogen atoms of these organic groups being substituted.

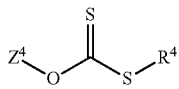

(4)

In the formula (4), $R^4$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^4$ represents an alkyl group, an alkenyl group, an alkynyl group, an aryl group, an aralkyl group, or an organic group having a part of hydrogen atoms of these organic groups being substituted.

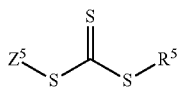

(5)

In the formula (5), $R^5$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^5$ represents an alkyl group, an alkenyl group, an alkynyl group, an aryl group, an aralkyl group, or an organic group having a part of hydrogen atoms of these organic groups being substituted.

Examples of (d) the RAFT agent include compounds where in the formula (1), R is one member selected from the group consisting of an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, and a halogen atom, and Z is an alkyl group having 1 to 18 carbon atoms, an alkoxy group having 1 to 18 carbon atoms, an aryloxy group having 6 to 20 carbon atoms, or a structure represented by the formulae (11) to (16). These compounds more easily control the reaction of (b) the co-crosslinking agent since the Z group thereof has a great chain transfer constant and the R group thereof rapidly cleaves.

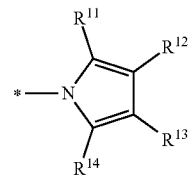

(11)

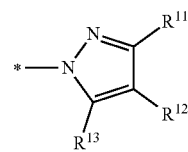

(12)

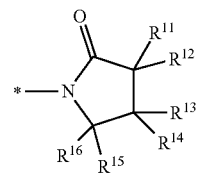

(13)

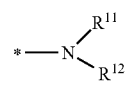

(14)

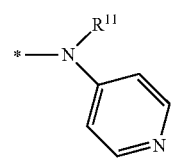

(15)

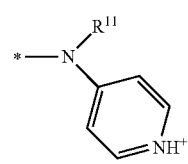

(16)

In the formulae (11) to (16), $R^{11}$ to $R^{16}$ represent an alkyl group having 1 to 18 carbon atoms, an aryl group having 6 to 20 carbon atoms, an aralkyl group having 6 to 20 carbon atoms, a hydrogen atom, or a halogen atom; and * represents a bonding site.

In addition, (d) the RAFT agent also preferably includes the compound represented by the formula (2). The compound represented by the formula (2) (dithiocarbamate) more easily controls the reaction of (b) the co-crosslinking agent since the intermediate radical is stabilized by the interaction between the unshared electron pair on N atom and C=S of the compound represented by the formula (2).

(d) The RAFT agent even more preferably includes a compound represented by the formula (21). The compound represented by the formula (21) more easily controls the reaction of (b) the co-crosslinking agent since the intermediate radical is stabilized by the resonance effect or inductive effect by having a pyrazol ring at the Z moiety in the formula (1).

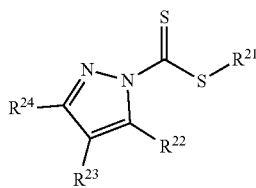

(21)

In the formula (21), $R^{21}$ represents an alkyl group having 1 to 18 carbon atoms, an alkenyl group having 2 to 18 carbon atoms, an alkynyl group having 2 to 18 carbon atoms, an aryl group having 6 to 20 carbon atoms, an aralkyl group having 6 to 20 carbon atoms, an alkoxy group having 1 to 18 carbon atoms, an aryloxy group having 6 to 20 carbon atoms, an aralkyloxy group having 6 to 20 carbon atoms, an alkanoyl group having 1 to 18 carbon atoms, an aroyl group having 6 to 20 carbon atoms, an alkanoyloxy group having 1 to 18 carbon atoms, an aroyloxy group having 6 to 20 carbon atoms, an alkylthio group having 1 to 18 carbon atoms, an arylthio group having 6 to 20 carbon atoms, or a halogen atom; and $R^{22}$, $R^{23}$ and $R^{24}$ represent an alkyl group having 1 to 18 carbon atoms, an aryl group having 6 to 20 carbon atoms, an aralkyl group having 6 to 20 carbon atoms, a hydrogen atom, or a halogen atom.

The amount of (d) the RAFT agent in the rubber composition is preferably 0.01 part by mass or more, more preferably 0.05 part by mass or more, and even more preferably 0.1 part by mass or more, and is preferably 19 parts by mass or less, more preferably 17 parts by mass or less, and even more preferably 15 parts by mass or less, with respect to 100 parts by mass of (a) the base rubber. If the amount of (d) the RAFT agent is 0.01 part by mass or more, the obtained spherical core has a greater hardness difference between the surface hardness thereof and the center hardness thereof, and if the amount of (d) the RAFT agent is 19 parts by mass or less, the spherical core is more easily formed.

The mass ratio ((d)/(b)) of (d) the RAFT agent to (b) the co-crosslinking agent in the rubber composition is preferably 0.001 or more, more preferably 0.002 or more, and even more preferably 0.004 or more, and is preferably 0.5 or less, more preferably 0.4 or less, and even more preferably 0.35 or less. If the mass ratio ((d)/(b)) is 0.001 or more, the obtained spherical core has a greater hardness difference between the surface hardness thereof and the center hardness thereof, and if the mass ratio ((d)/(b)) is 0.5 or less, the spherical core is more easily formed.

The mass ratio ((d)/(c)) of (d) the RAFT agent to (c) the crosslinking initiator in the rubber composition is preferably 0.05 or more, more preferably 0.1 or more, and even more preferably 0.15 or more, and is preferably 30 or less, more preferably 25 or less, and even more preferably 20 or less. If the mass ratio ((d)/(c)) is 0.05 or more, the obtained spherical core has a greater hardness difference between the surface hardness and the center hardness, and if the mass ratio is 30 or less, the spherical core is more easily formed.

Next, other materials used for the rubber composition will be explained.

((a) Base Rubber)

As (a) the base rubber, a natural rubber and/or a synthetic rubber can be used. For example, a polybutadiene rubber, a natural rubber, a polyisoprene rubber, a styrene polybutadiene rubber, or an ethylene-propylene-diene rubber (EPDM) can be used. These rubbers may be used solely, or at least two of these rubbers may be used in combination. (a) The base rubber preferably includes a diene-based rubber. The amount of the diene-based rubber in (a) the base rubber is preferably 50 mass % or more, more preferably 70 mass % or more, and even more preferably 90 mass % or more. It is also preferable that (a) the base rubber consists of the diene-based rubber. Among the diene-based rubber, particularly preferred is a high-cis polybutadiene having a cis-1,4 bond in an amount of 40 mass % or more, preferably 80 mass % or more, and more preferably 90 mass % or more in view of its superior resilience. The amount of the high-cis polybutadiene in (a) the base rubber is preferably 50 mass % or more, more preferably 70 mass % or more.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The rubber composition preferably contains at least two high-cis polybutadienes having a Mooney viscosity ($ML_{1+4}$ (100° C.)) different from each other, and more preferably contains two high-cis polybutadienes having a Mooney viscosity ($ML_{1+4}$ (100° C.)) different from each other, as (a) the base rubber. When two high-cis polybutadienes are contained, the first high-cis polybutadiene preferably has a Mooney viscosity ($ML_{1+4}$ (100° C.)) of less than 50, and the second high-cis polybutadiene preferably has a Mooney viscosity ($ML_{1+4}$ (100° C.)) of 50 or more.

The Mooney viscosity ($ML_{1+4}$ (100° C.)) of the first high-cis polybutadiene is preferably 30 or more, more preferably 32 or more, and even more preferably 35 or more, and is preferably less than 50, more preferably 49 or less, and even more preferably 48 or less. The Mooney viscosity ($ML_{1+4}$ (100° C.)) of the second high-cis polybutadiene is preferably 50 or more, more preferably 52 or more, and even more preferably 54 or more, and is preferably 100 or less, more preferably 90 or less, even more preferably 80 or less, and most preferably 70 or less.

The mass ratio (first high-cis polybutadiene/second high-cis polybutadiene) of the first high-cis polybutadiene to the second high-cis polybutadiene in (a) the base rubber is preferably 0.3 or more, more preferably 0.5 or more, and even more preferably 0.7 or more, and is preferably 3.0 or less, more preferably 2.0 or less, and even more preferably 1.5 or less.

The rubber composition also preferably contains the polybutadiene rubber and the polyisoprene rubber as (a) the base rubber. The Mooney viscosity ($ML_{1+4}$ (100° C.)) of the polyisoprene rubber is preferably 55 or more, more preferably 60 or more, and even more preferably 65 or more, and is preferably 120 or less, more preferably 110 or less, and even more preferably 100 or less.

The mass ratio (polybutadiene rubber/polyisoprene rubber) of the polybutadiene rubber to the polyisoprene rubber in (a) the base rubber is preferably 1 or more, more preferably 2 or more, and even more preferably 4 or more, and is preferably 20 or less, more preferably 15 or less, and even more preferably 10 or less.

((b) Co-Crosslinking Agent)

(b) The α,β-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain. The α,β-unsaturated carboxylic acid used as (b) the co-crosslinking agent preferably has 3 to 8 carbon atoms, more preferably has 3 to 6 carbon atoms, and even more preferably has 3 or 4 carbon atoms. It is noted that the α,β-unsaturated carboxylic acid having 3 to 8 carbon atoms and/or the metal salt thereof may be used solely, or two or more of them may be used in combination.

Examples of the α,β-unsaturated carboxylic acid having 3 to 8 carbon atoms include acrylic acid, methacrylic acid, fumaric acid, maleic acid and crotonic acid. When the rubber composition contains only the α,β-unsaturated carboxylic acid having 3 to 8 carbon atoms as the co-crosslinking agent, the rubber composition preferably further contains (e) a metal compound. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent.

Examples of the metal ion constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the α,β-unsaturated carboxylic acid having 3 to 8 carbon atoms is used, a metal crosslinking easily generates between the rubber molecules. Especially, as the divalent metal salt, the zinc salt of the α,β-unsaturated carboxylic acid having 3 to 8 carbon atoms is preferable, and zinc acrylate is more preferable, because the resilience of the obtained golf ball is enhanced by using them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is 15 parts by mass or more, the constituent member formed from the rubber composition can be made to have an appropriate hardness with a small amount of (c) the crosslinking initiator, and thus the golf ball has further enhanced resilience. On the other hand, if the amount of the α,β-unsaturated carboxylic acid having 3 to 8 carbon atoms and/or the metal salt thereof is 50 parts by mass or less, the constituent member formed from the rubber composition is not excessively hard, and thus the golf ball has better shot feeling.

((c) Crosslinking Initiator)

(c) The crosslinking initiator is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. These organic peroxides may be used solely or as a mixture of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, even more preferably 2.0 parts by mass or less, and most preferably 0.9 part by mass or less, with respect to 100 parts by mass of (a) the base rubber. If the amount is 0.2 part by mass or more, the constituent member formed from the rubber composition is not excessively soft, and thus the golf ball has better resilience, and if the amount is 5.0 parts by mass or less, the constituent member formed from the rubber composition has an appropriate hardness, the golf ball has better resilience and durability.

((e) Metal Compound)

When the rubber composition used in the present invention contains only the α,β-unsaturated carboxylic acid having 3 to 8 carbon atoms as the co-crosslinking agent, the rubber composition preferably further contains (e) a metal compound as an essential component. (e) The metal compound is not particularly limited, as long as (e) the metal compound is capable of neutralizing (b) the α,β-unsaturated carboxylic acid having 3 to 8 carbon atoms in the rubber composition. Examples of (e) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (e) the metal compound, the divalent metal compound is preferable, the zinc compound is more preferable. This is because the divalent metal compound reacts with the α,β-unsaturated carboxylic acid having 3 to 8 carbon atoms to form a metal crosslinking. In addition, if the zinc compound is used, the obtained golf ball has higher resilience. (e) The metal compound may be used solely, or at least two of them may be used in combination. The amount of (e) the metal compound can be appropriately adjusted according to the desired neutralization degree of (b) the α,β-unsaturated carboxylic acid having 3 to 8 carbon atoms and (d) the unsaturated aliphatic carboxylic acid.

((f) Organic Sulfur Compound)

The rubber composition may further contain (f) an organic sulfur compound different from (d) the RAFT agent. Examples of (f) the organic sulfur compound include at least one member selected from the group consisting of thiophenols, thionaphthols, polysulfides, thiurams, thiocarboxylic acids, dithiocarboxylic acids, sulfenamides, dithiocarbamates, thiazoles, and their metal salts. From the viewpoint of obtaining a greater hardness distribution in the spherical core, as (f) the organic sulfur compound, the organic sulfur compound having the thiol group (—SH), or the metal salt thereof is preferable, and thiophenols, thionaphthols or their metal salts are preferable.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, and pentaiodothiophenol; and metal salts thereof. As the metal salt, a zinc salt is preferable.

Examples of the thionaphthols (naphthalene thiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof, and 2-thionaphthol, 1-thionaphthol, or the metal salt thereof is preferable. As the metal salt, a divalent metal salt is preferable, a zinc salt is more preferable. Specific examples of the metal salt include zinc salt of 1-thionaphthol, and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide, thiuram disulfides such as tetramethylthiuram disulfide, tetraethylthiuram disulfide, and tetrabutylthiuram disulfide, and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(f) The organic sulfur compound may be used solely, or two or more of them may be used in combination. As (f) the organic sulfur compound, at least one member selected from the group consisting of the thiophenols and/or the metal salt thereof, the thionaphthols and/or the metal salt thereof, the diphenyl disulfides, and the thiuram disulfides is preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

The amount of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (f) the organic sulfur compound is less than 0.05 part by mass, the effect of adding (f) the organic sulfur compound may not be obtained and thus the resilience of the golf ball may not be enhanced. In addition, if the amount of (f) the organic sulfur compound exceeds 5.0 parts by mass, the obtained golf ball has a large compression deformation amount, and thus the resilience thereof may be lowered.

((g) Carboxylic Acid and/or Salt Thereof)

The rubber composition may contain (g) a carboxylic acid and/or a salt thereof. If the rubber composition contains (g) the carboxylic acid and/or the salt thereof, the obtained spherical core has a greater outer-hard and inner soft degree. Examples of (g) the carboxylic acid and/or the salt thereof include an aliphatic carboxylic acid, an aliphatic carboxylic acid salt, an aromatic carboxylic acid and an aromatic carboxylic acid salt. (g) The carboxylic acid and/or the salt thereof may be used solely, or as a mixture of two or more of them. It is noted that (g) the carboxylic acid and/or the salt thereof is a compound different from the compound used as (b) the co-crosslinking agent, and excludes the a,13-unsaturated carboxylic acid having 3 to 8 carbon atoms and the metal salt thereof.

The aliphatic carboxylic acid may be either a saturated aliphatic carboxylic acid (hereinafter sometimes referred to as "saturated fatty acid") or an unsaturated aliphatic carboxylic acid (hereinafter sometimes referred to as "unsaturated fatty acid"). In addition, the aliphatic carboxylic acid may have a branched or cyclic structure. The number of carbon atoms of the saturated fatty acid is preferably 1 or more, and is preferably 30 or less, more preferably 18 or less, and even more preferably 13 or less. The number of carbon atoms of the unsaturated fatty acid is preferably 5 or more, more preferably 7 or more, and even more preferably 8 or more, and is preferably 30 or less, more preferably 18 or less, and even more preferably 13 or less.

Examples of the aromatic carboxylic acid include a carboxylic acid having a benzene ring in the molecule, and a carboxylic acid having an aromatic heterocycle in the molecule. The aromatic carboxylic acid may be used solely, or two or more of them may be used in combination. Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. Examples of the carboxylic acid having the aromatic heterocycle include a carboxylic acid having a carboxyl group directly bonding to an aromatic heterocycle.

As the aliphatic carboxylic acid salt or aromatic carboxylic acid salt, a salt of the above mentioned aliphatic carboxylic acid or aromatic carboxylic acid can be used. Examples of the cation component of these salts include a metal ion, an ammonium ion, and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; other ion such as tin, zirconium and titanium. The cation component may be used solely, or two or more of them may be used in combination.

The organic cation is a cation having a carbon chain. The organic cation is not particularly limited, and examples thereof include an organic ammonium ion. Examples of the organic ammonium ion include a primary ammonium ion such as stearyl ammonium ion, hexyl ammonium ion, octyl ammonium ion and 2-ethylhexyl ammonium ion; a secondary ammonium ion such as dodecyl(lauryl) ammonium ion and octadecyl(stearyl) ammonium ion; a tertiary ammonium ion such as trioctyl ammonium ion; and a quaternary ammonium ion such as dioctyldimethyl ammonium ion and distearyldimethyl ammonium ion. These organic cations may be used solely, or two or more of them may be used in combination.

Examples of the aliphatic carboxylic acid and/or the salt thereof include a saturated fatty acid and/or a salt thereof, and an unsaturated fatty acid and/or a salt thereof. The saturated fatty acid and/or the salt thereof is preferable, and caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt and cobalt salt, are preferable. As the unsaturated fatty acid and/or the salt thereof, palmitoleic acid, oleic acid, linoleic acid, arachidonic acid, and their potassium salt, magnesium salt, calcium salt, aluminum salt, zinc salt, iron salt, copper salt, nickel salt and cobalt salt, are preferable.

As the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and their potassium salt, magnesium salt, calcium salt, aluminum salt, zinc salt, iron salt, copper salt, nickel salt and cobalt salt, are particularly preferable.

The amount of (g) the carboxylic acid and/or the salt thereof is, for example, preferably 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the amount of (g) the carboxylic acid and/or the salt thereof is 0.5 part by mass or more, the spherical core has a greater outer-hard and inner soft degree, and if the amount of (g) the carboxylic acid and/or the salt thereof is 40 parts by mass or less, lowering in the core hardness is suppressed, and thus the resilience is better.

(Additive)

The rubber composition may further contain an additive such as a pigment, a filler for adjusting weight or the like, an antioxidant, a peptizing agent, and a softener, where necessary. In addition, the rubber composition may contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder.

The amount of the antioxidant is preferably 0.1 part by mass or more and is preferably 1 part by mass or less with respect to 100 parts by mass of (a) the base rubber. In addition, the amount of the peptizing agent is preferably 0.1 part by mass or more and is preferably 5 parts by mass or less with respect to 100 parts by mass of (a) the base rubber.

[Preparation of Rubber Composition]

The rubber composition can be obtained by mixing and kneading (a) the base rubber, (b) the co-crosslinking agent, (c) the crosslinking initiator, (d) the RAFT agent, and other optional additives or the like used where necessary. The kneading method is not particularly limited. For example, the kneading can be conducted with a conventional kneading machine such as a kneading roll, a banbury mixer and a kneader.

(Molding of Core)

The spherical core of the golf ball according to the present invention can be obtained by molding the kneaded rubber composition in a mold. The temperature for molding the spherical core is preferably 100° C. or more, more preferably 110° C. or more, and even more preferably 120° C. or more, and is preferably 170° C. or less. If the molding temperature is more than 170° C., the core surface hardness tends to be lowered. In addition, the pressure during the molding preferably ranges from 2.9 MPa to 11.8 MPa. The molding time preferably ranges from 10 minutes to 60 minutes.

(Properties of Spherical Core)

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the resilience is better. On the other hand, if the diameter of the spherical core is 42.2 mm or less, the cover is not excessively thin, and thus the cover functions better.

When the spherical core has a diameter in a range of from 34.8 mm to 42.2 mm, the compression deformation amount (shrinking amount along the compression direction) of the spherical core when applying a load from 98 N as an initial load to 1275 N as a final load to the spherical core is preferably 2.0 mm or more, more preferably 2.8 mm or more, and is preferably 6.0 mm or less, more preferably 5.0 mm or less. If the compression deformation amount is 2.0 mm or more, the shot feeling is better, and if the compression deformation amount is 6.0 mm or less, the resilience is better.

The hardness difference (Hs-Ho) of the spherical core between the surface hardness (Hs) thereof and the center hardness (Ho) thereof is preferably 20 or more, more preferably 25 or more, and even more preferably 28 or more, and is preferably 55 or less, more preferably 50 or less, and even more preferably 45 or less in Shore C hardness. If the hardness difference is great, the obtained golf ball has a high launch angle and a low spin rate, and thus travels a great flight distance.

The center hardness (Ho) of the spherical core is preferably 20 or more, more preferably 25 or more, and even more preferably 30 or more in Shore C hardness. If the center hardness (Ho) of the spherical core is 20 or more in Shore C hardness, the spherical core is not excessively soft, and thus the resilience is better. In addition, the center hardness (Ho) of the spherical core is preferably 75 or less, more preferably 70 or less, and even more preferably 65 or less in Shore C hardness. If the center hardness (Ho) of the spherical core is 75 or less in Shore C hardness, the spherical core is not excessively hard, and thus the shot feeling is better.

The surface hardness (Hs) of the spherical core is preferably 55 or more, more preferably 60 or more, and even more preferably 65 or more, and is preferably 95 or less, more preferably 90 or less, and even more preferably 85 or less in Shore C hardness. If the surface hardness of the spherical core is 55 or more in Shore C hardness, the spherical core is not excessively soft, and thus the resilience is better. In addition, if the surface hardness of the spherical core is 95 or less in Shore C hardness, the spherical core is not excessively hard, and thus the shot feeling is better.

[Cover]

The cover is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "TEFABLOC (registered trademark)" available from Mitsubishi Chemical Corporation.

Examples of the ionomer resin include a product prepared by neutralizing at least a part of carboxyl groups in a binary copolymer composed of an olefin and an $\alpha,\beta$-unsaturated carboxylic acid having 3 to 8 carbon atoms with a metal ion, a product prepared by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion, or a mixture thereof. The olefin is preferably an olefin having 2 to 8 carbon atoms. Examples of the olefin include ethylene, propylene, butene, pentene, hexene, heptene, and octane. In particular, ethylene is preferable. Examples of the $\alpha,\beta$-unsaturated carboxylic acid having 3 to 8 carbon atoms include acrylic acid, methacrylic acid, fumaric acid, maleic acid and crotonic acid. In particular, acrylic acid and methacrylic acid are preferable. Examples of the $\alpha,\beta$-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Among these, the ionomer resin is preferably a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. a binary copolymerized ionomer resin such as Himilan 1555 (Na), Himilan 1557 (Zn), Himilan 1605 (Na), Himilan 1706 (Zn), Himilan 1707 (Na), and Himilan AM3711 (Mg); and a ternary copolymerized ionomer resin such as Himilan 1856 (Na), and Himilan 1855 (Zn))" available from Dow-Mitsui Polychemicals Co., Ltd.

Further, examples of the ionomer resin include "Surlyn (registered trademark) (e.g. a binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li); and a ternary copolymerized ionomer resin such as Surlyn 8120 (Na), Surlyn 8320 (Na), Surlyn 9320 (Zn), Surlyn 6320 (Mg), HPF 1000 (Mg), and HPF 2000 (Mg))" available from Dow Chemical Co., Ltd.

It is noted that Na, Zn, Li, Mg, or the like described in the parenthesis after the trade name of the ionomer resin indicates a metal type of the neutralizing metal ion for the ionomer resin. The ionomer resin may be used solely, or a mixture of at least two of them may be used.

The cover composition constituting the cover preferably contains the thermoplastic polyurethane elastomer or the ionomer resin as a resin component. When the ionomer resin is used, the thermoplastic styrene elastomer is also preferably used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, or a fluorescent material or fluorescent brightener, as long as they do not impair the performance of the cover.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and even more preferably 60 or more in shore D hardness, and preferably has a slab hardness of 80 or less, more preferably 70 or less, and even more preferably 68 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more, and even more preferably 30 or more in shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different as long as the slab hardness of the cover composition constituting each layer falls within the above range.

Examples of the method of molding the cover include a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding); and a method which comprises injection molding the cover composition directly onto the core.

When molding the cover in a compression molding method, molding of the half shell can be performed by either the compression molding method or the injection molding method, and the compression molding method is preferred. Compression molding the cover composition into a half shell can be carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness can be formed. Examples of the method for molding the cover by using the half shell include a method which comprises covering the core with two of the half shells and then performing compression molding. Compression molding half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness can be formed.

In the case of injection molding the cover composition into the cover, the cover composition extruded in a pellet form may be used for injection molding, or the cover materials such as the base resin components and the pigment may be dry blended, followed by directly injection molding the blended materials. It is preferred to use upper and lower molds having a hemispherical cavity and pimples for forming the cover, wherein a part of the pimples also serves as a retractable hold pin. When molding the cover by injection molding, the hold pin is protruded to hold the core, the cover composition is charged and then cooled to form the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to form the cover.

Concave portions called "dimples" are usually formed on the surface of the cover when the cover is molded. The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the sizes of the respective dimples are small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The thickness of the cover is preferably 4.0 mm or less, more preferably 3.0 mm or less, and even more preferably 2.0 mm or less. If the cover has a thickness of 4.0 mm or less, the resultant golf ball has better resilience or shot feeling. The thickness of the cover is preferably 0.3 mm or more, more preferably 0.5 mm or more, even more preferably 0.8 mm or more, and most preferably 1.0 mm or more. If the cover has a thickness of less than 0.3 mm, the durability or wear resistance of the cover may be lowered. In the case that the golf ball comprises a plurality of cover layers, the total thickness of a plurality of cover layers preferably falls within the above range.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The construction of the golf ball according to the present invention is not particularly limited, as long as the golf ball comprises a spherical core and at least one cover layer covering the spherical core. The spherical core is preferably single layered. Unlike a multiple layered core, the single layered spherical core does not have an energy loss at the interface of the multiple layered core when being hit, and thus has better resilience. In addition, the cover has a construction composed of at least one layer, and may have either a single layered construction or a multiple layered construction composed of at least two layers. Examples of the golf ball according to the present invention include a two-piece golf ball composed of a spherical core and a single layered cover disposed around the spherical core; a multi-piece golf ball (including a three-piece golf ball) composed of a spherical core and at least two cover layers disposed around the spherical core; and a wound golf ball composed of a spherical core, a rubber thread layer formed around the spherical core and a cover disposed around the rubber thread layer. The present invention can be suitably applied to any one of the above golf balls.

The golf ball according to the present invention preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball according to the present invention preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball according to the present invention has a diameter in a range of from 40 mm to 45 mm, the compression deformation amount (shrinking amount along the compression direction) of the golf ball when applying a load from an initial load of 98 N to a final load of 1275 N to the golf ball is preferably 2.0 mm or more, more preferably 2.2 mm or more, and even more preferably 2.4 mm or more, and is preferably 5.0 mm or less, more preferably 4.9 mm or less, and even more preferably 4.8 mm or less. If the compression deformation amount is 2.0 mm or more, the golf ball does not become excessively hard, and thus the shot feeling is better. On the other hand, if the compression deformation amount is 5.0 mm or less, the resilience is better.

The FIGURE is a partially cutaway cross-sectional view of a golf ball 1 according to one embodiment of the present invention. The golf ball 1 comprises a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

EXAMPLES

Next, the present invention will be described in detail by way of examples. However, the present invention is not limited to the examples described below. Various changes and modifications without departing from the spirit of the present invention are included in the scope of the present invention.

[Evaluation Method]

(1) Compression Deformation Amount (mm)

The deformation amount along the compression direction of the core or golf ball (shrinking amount along the compression direction of the core or golf ball), when applying a load from an initial load of 98 N to a final load of 1275 N to the core or golf ball, was measured.

(2) Core Hardness (Shore C Hardness)

The surface hardness was measured at the surface of the core. In addition, the core was cut into two hemispheres to obtain a cut plane, and the hardness at the central point of the cut plane and the hardness at predetermined distances from the central point were measured. The hardness was measured with an automatic hardness tester (Digitest II, available from Bareiss company) using a testing device of "Shore C".

(3) Slab Hardness (Shore D Hardness)

Sheets with a thickness of about 2 mm were produced by injection molding the resin composition. The sheets were stored at a temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Spin Rate on Driver Shots

A driver provided with a titanium head (SRIXON Z745, loft angle: 8.5°, available from Sumitomo Rubber Industries, Ltd.) was installed on a swing robot M/C available from True Temper Sports, Inc. The golf ball was hit at a head speed of 50 m/sec, and the spin rate of the golf ball immediately after the hitting was measured. The measurement was conducted ten times for each golf ball, and the average value thereof was adopted as the measurement value for that golf ball. It is noted that the spin rate of the golf ball immediately after the hitting was measured by continuously taking a sequence of photographs of the hit golf ball. It is noted that the spin rate of each golf ball is shown as a difference from the spin rate of the golf ball No. 5 in Table 1, as a difference from the spin rate of the golf ball No. 10 in Table 2, and as a difference from the spin rate of the golf ball No. 13 in Table 3, respectively.

[Production of Golf Ball]

(1) Production of Core

The rubber compositions having the formulations shown in Tables 1 to 3 were kneaded with a kneading roll, and heat-pressed in upper and lower molds, each having a hemispherical cavity, at a temperature of 170° C. for 20 minutes to produce spherical cores having a diameter of 39.8 mm.

TABLE 1

| | | | Golf ball No. | 1 | 2 | 3 | 4 | 5 | 6 | 7 |
|---|---|---|---|---|---|---|---|---|---|---|
| Rubber composition | Formulation (Parts by mass) | (a) | BR730 | 100 | 100 | 100 | 100 | 100 | 100 | 100 |
| | | (e) | Zinc oxide | 5 | 5 | 5 | 5 | 5 | 5 | 5 |
| | | (b) | ZNDA90S | 30 | 30 | 30 | 45 | 28 | 26 | 28 |
| | | (d) | Cyanomethyl 3,5-dimethylpyrazol-1-carbodithioate | 0.1 | 0.6 | 1.2 | — | — | 0.05 | — |
| | | | 2'-Cyanobutane-2'-yl 4-chloro-3,5-dimethylpyrazol-1-carbodithioate | — | — | — | 1.6 | — | — | — |
| | | (f) | Diphenyl disulfide | — | — | — | — | — | — | 0.11 |
| | | (c) | Dicumyl peroxide | 0.8 | 0.8 | 0.8 | 0.8 | 0.8 | 0.8 | 0.8 |
| | Mass ratio ((d)/(b)) | | | 0.004 | 0.022 | 0.044 | 0.040 | — | 0.002 | — |
| | Mass ratio ((d)/(c)) | | | 0.13 | 0.75 | 1.50 | 2.00 | — | 0.06 | — |
| Spherical core | Compression deformation amount (mm) | | | 3.29 | 3.39 | 3.61 | 3.85 | 3.51 | 3.69 | 3.74 |
| | Core hardness distribution (Shore C) | | Center hardness (Ho) | 53.1 | 54.1 | 52.0 | 44.1 | 59.5 | 58.7 | 55.5 |
| | | | Hardness at 12.5% point | 67.9 | 65.5 | 66.0 | 47.3 | 65.9 | 65.1 | 62.1 |
| | | | Hardness at 25% point | 72.4 | 69.7 | 70.0 | 50.9 | 69.5 | 72.6 | 65.0 |
| | | | Hardness at 37.5% point | 73.4 | 71.6 | 71.0 | 54.7 | 71.0 | 73.6 | 66.3 |
| | | | Hardness at 50% point | 73.9 | 72.2 | 72.0 | 57.2 | 71.3 | 74.1 | 66.7 |
| | | | Hardness at 62.5% point | 73.1 | 71.4 | 71.0 | 60.5 | 70.6 | 73.2 | 66.5 |
| | | | Hardness at 75% point | 70.2 | 69.9 | 73.0 | 71.6 | 72.9 | 70.2 | 69.0 |
| | | | Surface hardness (Hs) | 84.0 | 83.2 | 86.1 | 86.0 | 81.8 | 84.1 | 81.3 |
| | | | Hardness difference (Hs − Ho) | 30.9 | 29.1 | 34.1 | 41.9 | 22.3 | 25.4 | 25.9 |
| Golf ball | Compression deformation amount (mm) | | | 2.84 | 2.97 | 3.22 | 3.33 | 2.98 | 3.23 | 3.25 |
| | Spin rate on driver shots (rpm) | | | −30 | −30 | −60 | −100 | 0 | −10 | 0 |

TABLE 2

| | | | Golf ball No. | 8 | 9 | 10 |
|---|---|---|---|---|---|---|
| Rubber composition | Formulation (Parts by mass) | (a) | BR730 | 100 | 100 | 100 |
| | | (e) | Zinc oxide | 5 | 5 | 5 |
| | | (b) | ZNDA90S | 30 | 35 | 22 |
| | | (d) | Cyanomethyl 3,5-dimethylpyrazol-1-carbodithioate | 3 | 5.9 | — |
| | | | 2'-Cyanobutane-2'-yl 4-chloro-3,5-dimethylpyrazol-1-carbodithioate | — | — | — |
| | | (f) | Diphenyl disulfide | — | — | — |
| | | (c) | Dicumyl peroxide | 0.8 | 1.2 | 0.8 |
| | Mass ratio ((d)/(b)) | | | 0.111 | 0.187 | — |
| | Mass ratio ((d)/(c)) | | | 3.75 | 4.92 | — |
| Spherical core | Compression deformation amount (mm) | | | 4.24 | 4.73 | 4.46 |
| | Core hardness distribution (Shore C) | | Center hardness (Ho) | 43.0 | 38.2 | 52.6 |
| | | | Hardness at 12.5% point | 57.0 | 47.9 | 57.7 |
| | | | Hardness at 25% point | 65.0 | 55.6 | 61.4 |
| | | | Hardness at 37.5% point | 67.0 | 59.7 | 63.3 |
| | | | Hardness at 50% point | 68.0 | 60.2 | 63.8 |
| | | | Hardness at 62.5% point | 67.0 | 59.2 | 64.1 |
| | | | Hardness at 75% point | 69.0 | 64.8 | 68.2 |
| | | | Surface hardness (Hs) | 83.0 | 74.9 | 74.0 |
| | | | Hardness difference (Hs − Ho) | 40.0 | 36.7 | 21.5 |
| Golf ball | Compression deformation amount (mm) | | | 3.88 | 4.13 | 4.13 |
| | Spin rate on driver shots (rpm) | | | −100 | −70 | 0 |

TABLE 3

| | | | Golf ball No. | 11 | 12 | 13 | 14 |
|---|---|---|---|---|---|---|---|
| Rubber composition | Formulation (Parts by mass) | (a) | BR730 | 100 | 100 | 100 | 100 |
| | | (e) | Zinc oxide | 5 | 5 | 5 | 5 |
| | | (b) | ZNDA90S | 40 | 55 | 18 | 60 |
| | | (d) | Cyanomethyl 3,5-dimethylpyrazol-1-carbodithioate | 8 | 12 | — | 20 |
| | | | 2'-Cyanobutane-2'-yl 4-chloro-3,5-dimethylpyrazol-1-carbodithioate | — | — | — | — |
| | | (f) | Diphenyl disulfide | — | — | — | — |
| | | (c) | Dicumyl peroxide | 1.2 | 1.2 | 0.8 | 0.8 |
| | Mass ratio ((d)/(b)) | | | 0.222 | 0.242 | — | 0.370 |
| | Mass ratio ((d)/(c)) | | | 6.67 | 10.00 | — | 25.00 |

TABLE 3-continued

| | | Golf ball No. | 11 | 12 | 13 | 14 |
|---|---|---|---|---|---|---|
| Spherical core | Compression deformation amount (mm) | | 5.02 | 5.11 | 5.22 | Not moldable |
| | Core hardness distribution (Shore C) | Center hardness (Ho) | 35.4 | 33.8 | 48.7 | |
| | | Hardness at 12.5% point | 44.1 | 41.9 | 53.7 | |
| | | Hardness at 25% point | 52.4 | 50.5 | 56.6 | |
| | | Hardness at 37.5% point | 57.1 | 55.6 | 57.9 | |
| | | Hardness at 50% point | 57.6 | 56.1 | 58.3 | |
| | | Hardness at 62.5% point | 56.6 | 55.1 | 60.5 | |
| | | Hardness at 75% point | 60.1 | 58.3 | 64.2 | |
| | | Surface hardness (Hs) | 71.6 | 68.2 | 69.7 | |
| | | Hardness difference (Hs − Ho) | 36.2 | 34.4 | 21.0 | |
| Golf ball | Compression deformation amount (mm) | | 4.55 | 4.62 | 4.69 | |
| | Spin rate on driver shots (rpm) | | −70 | −60 | 0 | |

The materials used in Tables 1 to 3 are shown as follows.

Polybutadiene rubber: "BR730" (high-cis polybutadiene rubber (cis-1,4 bond amount=96 mass %, 1,2-vinyl bond amount=1.3 mass %, Moony viscosity ($ML_{1+4}$ (100° C.))=55, molecular weight distribution (Mw/Mn)=3) available from JSR Corporation Zinc oxide: WHITE SEAL available from INDOLY-SAGHT Co. Ltd.

ZNDA90S: zinc acrylate (including 10 mass % of zinc stearate) available from Nisshoku Techno Fine Chemical Co., Ltd.

Cyanomethyl 3,5-dimethylpyrazol-1-carbodithioate: available from FUJIFILM Wako Pure Chemical Corporation 2'-Cyanobutane-2'-yl 4-chloro-3,5-dimethylpyrazol-1-carbodithioate: available from FUJIFILM Wako Pure Chemical Corporation Diphenyl disulfide: available from Sumitomo Seika Chemicals. Co. Ltd.

Dicumyl peroxide: "Percumyl (registered trademark) D" available from NOF Corporation (2) Production of Cover According to the formulation shown in Table 2, the materials were mixed with a twin-screw kneading type extruder to prepare the cover composition in a pellet form. The conditions for extruding the cover composition were a screw diameter of 45 mm, a screw rotational speed of 200 rpm, and screw L/D=35, and the mixture was heated to 160 to 230° C. at the die position of the extruder.

TABLE 4

| Cover composition No. | | |
|---|---|---|
| Formulation (Parts by mass) | Himilan 1555 | 40 |
| | Himilan 1605 | 20 |
| | Himilan AM7329 | 40 |
| | Titanium dioxide | 3 |
| | JF-90 | 0.2 |
| Slab hardness (Shore D) | | 63 |

The materials used in Table 4 are shown as follows.

Himilan 1555: Na neutralized ionomer available from Dow-Mitsui Polychemicals Co., Ltd.

Himilan 1605: Na neutralized ionomer available from Dow-Mitsui Polychemicals Co., Ltd.

Himilan AM7329: Zn neutralized ionomer available from Dow-Mitsui Polychemicals Co., Ltd.

Titanium dioxide: A-220 available from Ishihara Sangyo Kaisha, Ltd.

JF-90: light stabilizer available from Johoku Chemical Co., Ltd.

The cover composition obtained above was injection molded on the spherical core obtained as described above to mold the cover covering the spherical core. Upper and lower molds for molding the cover have a hemispherical cavity and pimples, wherein a part of the pimples also serves as a retractable hold pin. When molding the cover, the hold pin was protruded to hold the core charged into the mold, and the resin heated to 210° C. to 260° C. was charged for 0.3 second into the mold held under a pressure of 80 tons, and cooled for 30 seconds, and the mold was opened to eject the golf ball.

The surface of the obtained golf ball body was subjected to a sandblast treatment, and a mark was formed thereon. Then, a clear paint was applied to the golf ball body, and the paint was dried in an oven of 40° C. to obtain a golf ball having a diameter of 42.8 mm and a mass of 45.4 g. The evaluation results of the obtained golf balls are shown in Table 1.

The golf balls No. 1 to 4, 6, 8, 9, 11 and 12 are the cases that the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a compound represented by the formula (1) as a RAFT agent. These golf balls have a lowered spin rate on driver shots compared to the golf ball in which (d) the RAFT agent is not used.

This application is based on Japanese patent application No. 2019-178510 filed on Sep. 30, 2019, the contents of which are hereby incorporated by reference.

The invention claimed is:

1. A golf ball comprising a spherical core and at least one cover layer covering the spherical core, wherein the spherical core is formed from a rubber composition containing (a) a base rubber, (b) a co-crosslinking agent, (c) a crosslinking initiator, and (d) a Reversible Addition Fragmentation chain Transfer agent, (b) the co-crosslinking agent contains an α,β-unsaturated carboxylic acid having 3 to 8 carbon atoms and/or a metal salt thereof, and (d) the Reversible Addition Fragmentation chain Transfer agent includes a compound represented by the formula (1):

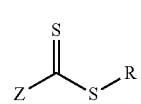

(1)

in the formula (1), R represents a monovalent organic group, and Z represents a monovalent organic group.

2. The golf ball according to claim 1, wherein in the formula (1), R is an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and Z is an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, a dialkylphosphonate group, a diarylphosphonate group, a dialkylphosphinate group, a diarylphosphinate group, an organic group having a part of hydrogen atoms of these organic groups being substituted, a hydrogen atom, or a halogen atom.

3. The golf ball according to claim 1, wherein (d) the Reversible Addition Fragmentation chain Transfer agent includes at least one compound selected from the group consisting of compounds represented by the formulae (2) to (5):

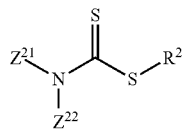

(2)

in the formula (2), $R^2$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^{21}$ and $Z^{22}$ represent an alkyl group, an alkenyl group, an alkynyl group, an aryl group, an aralkyl group, an amino group, or an organic group having a part of hydrogen atoms of these organic groups being substituted, and may bond to each other to form a cyclic structure;

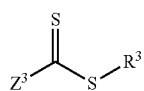

(3)

in the formula (3), $R^3$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^3$ represents an alkyl group, an alkenyl group, an alkynyl group, an aryl group, an aralkyl group, or an organic group having a part of hydrogen atoms of these organic groups being substituted;

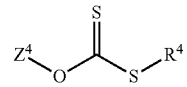

(4)

in the formula (4), $R^4$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^4$ represents an alkyl group, an alkenyl group, an alkynyl group, an aryl group, an aralkyl group, or an organic group having a part of hydrogen atoms of these organic groups being substituted;

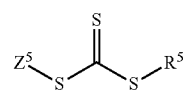

(5)

in the formula (5), $R^5$ represents an alkyl group, an alkenyl group, an alkynyl group, an aryl group, an aralkyl group, an alkoxy group, an aryloxy group, an aralkyloxy group, an alkanoyl group, an aroyl group, an alkanoyloxy group, an aroyloxy group, an alkylthio group, an arylthio group, an organic group having a part of hydrogen atoms of these organic groups being substituted, or a halogen atom; and $Z^5$ represents an alkyl group, an alkenyl group, an alkynyl group, an aryl group, an aralkyl group, or an organic group having a part of hydrogen atoms of these organic groups being substituted.

4. The golf ball according to claim 2, wherein in the formula (1), Z is an alkyl group having 1 to 18 carbon atoms, an alkoxy group having 1 to 18 carbon atoms, an aryloxy group having 6 to 20 carbon atoms, or a structure represented by one of the formulae (11) to (16):

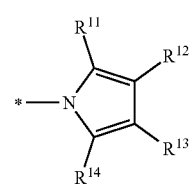

(11)

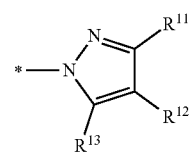

(12)

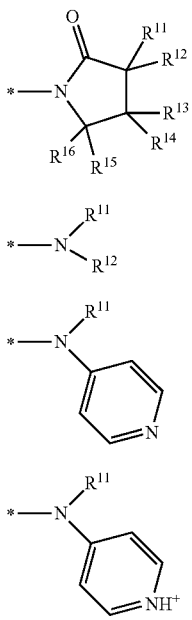

in the formulae (11) to (16), $R^{11}$ to $R^{16}$ represent an alkyl group having 1 to 18 carbon atoms, an aryl group having 6 to 20 carbon atoms, an aralkyl group having 6 to 20 carbon atoms, a hydrogen atom, or a halogen atom; and * represents a bonding site.

5. The golf ball according to claim 1, wherein (d) the Reversible Addition Fragmentation chain Transfer agent includes a compound represented by the formula (21):

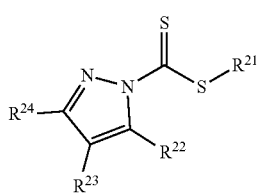

in the formula (21), $R^{21}$ represents an alkyl group having 1 to 18 carbon atoms, an alkenyl group having 2 to 18 carbon atoms, an alkynyl group having 2 to 18 carbon atoms, an aryl group having 6 to 20 carbon atoms, an aralkyl group having 6 to 20 carbon atoms, an alkoxy group having 1 to 18 carbon atoms, an aryloxy group having 6 to 20 carbon atoms, an aralkyloxy group having 6 to 20 carbon atoms, an alkanoyl group having 1 to 18 carbon atoms, an aroyl group having 6 to 20 carbon atoms, an alkanoyloxy group having 1 to 18 carbon atoms, an aroyloxy group having 6 to 20 carbon atoms, an alkylthio group having 1 to 18 carbon atoms, an arylthio group having 6 to 20 carbon atoms, or a halogen atom; and $R^{22}$, $R^{23}$ and $R^{24}$ represent an alkyl group having 1 to 18 carbon atoms, an aryl group having 6 to 20 carbon atoms, an aralkyl group having 6 to 20 carbon atoms, a hydrogen atom, or a halogen atom.

6. The golf ball according to claim 1, wherein the rubber composition contains (d) the Reversible Addition Fragmentation chain Transfer agent in an amount of from 0.01 part by mass to 19 parts by mass with respect to 100 parts by mass of (a) the base rubber.

7. The golf ball according to claim 1, wherein the spherical core has a hardness difference (Hs-Ho) in a range of from 20 to 50 in Shore C hardness between a center hardness (Ho) of the spherical core and a surface hardness (Hs) of the spherical core.

8. The golf ball according to claim 1, wherein the spherical core has a center hardness (Ho) in a range of from 20 to 75 in Shore C hardness.

9. The golf ball according to claim 1, wherein the spherical core has a surface hardness (Hs) in a range of from 55 to 95 in Shore C hardness.

10. The golf ball according to claim 1, wherein a mass ratio ((d)/(b)) of (d) the Reversible Addition Fragmentation chain Transfer agent to (b) the co-crosslinking agent ranges from 0.001 to 0.5.

11. The golf ball according to claim 1, wherein a mass ratio ((d)/(c)) of (d) the Reversible Addition Fragmentation chain Transfer agent to (c) the crosslinking initiator ranges from 0.05 to 30.

12. A golf ball comprising a spherical core and at least one cover layer covering the spherical core, wherein the spherical core is formed from a rubber composition containing (a) a base rubber, (b) a co-crosslinking agent, (c) a crosslinking initiator, and (d) a Reversible Addition Fragmentation chain Transfer agent,
(b) the co-crosslinking agent contains an α,β-unsaturated carboxylic acid having 3 to 8 carbon atoms and/or a metal salt thereof, and
(d) the Reversible Addition Fragmentation chain Transfer agent includes a compound represented by the formula (21):

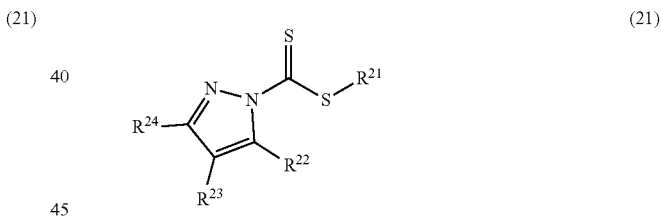

in the formula (21), $R^{21}$ represents an alkyl group having 1 to 18 carbon atoms or an alkyl group having 1 to 18 carbon atoms and a substituent group; and $R^{22}$, $R^{23}$ and $R^{24}$ represent an alkyl group having 1 to 18 carbon atoms, an aryl group having 6 to 20 carbon atoms, an aralkyl group having 6 to 20 carbon atoms, a hydrogen atom, or a halogen atom.

13. The golf ball according to claim 12, wherein $R^{21}$ represents a cyanoalkyl group having 1 to 18 carbon atoms, and $R^{22}$, $R^{23}$ and $R^{24}$ represent a hydrogen atom, or a halogen atom.

14. The golf ball according to claim 12, wherein the rubber composition contains (d) the Reversible Addition Fragmentation chain Transfer agent in an amount of from 0.01 part by mass to 19 parts by mass with respect to 100 parts by mass of (a) the base rubber.

15. The golf ball according to claim 12, wherein the spherical core has a hardness difference (Hs-Ho) in a range of from 20 to 50 in Shore C hardness between a center hardness (Ho) of the spherical core and a surface hardness (Hs) of the spherical core.

16. The golf ball according to claim 12, wherein the spherical core has a center hardness (Ho) in a range of from 20 to 75 in Shore C hardness.

17. The golf ball according to claim 12, wherein the spherical core has a surface hardness (Hs) in a range of from 55 to 95 in Shore C hardness.

18. The golf ball according to claim 12, wherein a mass ratio ((d)/(b)) of (d) the Reversible Addition Fragmentation chain Transfer agent to (b) the co-crosslinking agent ranges from 0.001 to 0.5.

19. The golf ball according to claim 12, wherein a mass ratio ((d)/(c)) of (d) the Reversible Addition Fragmentation chain Transfer agent to (c) the crosslinking initiator ranges from 0.05 to 30.

* * * * *